United States Patent [19]

Kishida et al.

[11] Patent Number: 4,985,496

[45] Date of Patent: Jan. 15, 1991

[54] THERMOPLASTIC RESIN COMPOSITION

[75] Inventors: Kazuo Kishida, Tokyo, Japan; Kiyokazu Kitai, Westfield, N.J.; Masaaki Mohri, Ohtake, Japan

[73] Assignee: Mitsubishi Rayon Company, Ltd., Tokyo, Japan

[21] Appl. No.: 366,653

[22] Filed: Jun. 15, 1989

[30] Foreign Application Priority Data

Jun. 15, 1988 [JP] Japan ................................ 63-145629

[51] Int. Cl.$^5$ ..................... C08L 35/06; C08L 51/04
[52] U.S. Cl. ..................................... 525/74; 525/80; 525/84; 525/86
[58] Field of Search ................. 525/68, 74, 86, 84, 525/83

[56] References Cited

U.S. PATENT DOCUMENTS

| | | | |
|---|---|---|---|
| 4,269,950 | 5/1981 | Abolins et al. | 525/68 |
| 4,280,948 | 7/1981 | Dieck | 525/68 |
| 4,444,951 | 4/1984 | Mendelson | 525/74 |
| 4,870,131 | 9/1989 | Pisipati et al. | 525/74 |

FOREIGN PATENT DOCUMENTS 0071786  2/1983  European Pat. Off. .
0144081  6/1985  European Pat. Off. .

OTHER PUBLICATIONS

Chemical Abstracts, vol. 105, No. 22, Dec. 1, 1986, p. 43, Abstract No. 192204a, Columbus, Ohio, U.S.; & JP-A-61 113 638 (Mitsubishi Rayon Co., Ltd.), 31-0-5-1986.

*Primary Examiner*—Allan M. Lieberman
*Attorney, Agent, or Firm*—Oblon, Spivak, McClelland, Maier & Neustadt

[57] ABSTRACT

Disclosed is a thermoplastic resin composition comprising (A) a graft copolymer obtained by emulsion-graft-polymerizing 0 to 20% by weight of an acrylic monomer and 0 to 60% by weight of an aromatic vinyl monomer in the presence of 40 to 80% by weight (as solids) of a diene type rubber polymer latex containing at least 50% by weight of a diene type rubber polymer having a weight average particle diameter of at least 0.3 μm, and (B) a copolymer of an $\alpha,\beta$-unsaturated cyclic anhydride and an aromatic vinyl compound. The thermoplastic resin composition has a high heat resistance and impact resistance.

11 Claims, No Drawings

THERMOPLASTIC RESIN COMPOSITION

BACKGROUND OF THE INVENTION (1) Field of the Invention

The present invention relates to a thermoplastic resin composition. More specifically, the present invention relates to a thermoplastic resin composition having a high heat resistance and an excellent impact strength. The thermoplastic resin composition of the present invention can be advantageously used in the fields of automobile parts, for example, interior trims such as meter hoods, meter clusters, instrument panels and console boxes, and exterior trims such as bumpers, exterior plates and lamp housings, and for various machine parts.

(2) Description of the Related Art

It is known that a copolymer of an aromatic vinyl compound, especially styrene, with maleic anhydride has a higher glass transition temperature and a higher heat distortion temperature, compared with commercially available styrene resins, but this copolymer has inferior mechanical properties, especially impact resistance, and is very brittle. Accordingly, the copolymer can be practically used only over a very limited range.

As the means for improving the impact resistance of the aromatic vinyl compound/maleic anhydride copolymer, there is known a process in which a rubber component is introduced into the copolymer. For example, British Patent No. 1,402,323 discloses a process in which a vinyl aromatic compound is copolymerized with maleic anhydride in the presence of a rubber; Japanese Unexamined Patent Publication No. 54-50553 discloses a process in which a third component such as an aromatic polycarbonate and/or an aromatic polyallylate is blended together with the rubber component; and Japanese Unexamined Patent Publication No. 54-28355 and U.S. Pat. No. 4,269,950 disclose a process in which the impact resistance is improved by an introduction of an ABS resin (acrylonitrile/butadiene/styrene copolymer resin), a rubber-modified polystyrene resin or an MBS resin (methyl methacrylate/butadiene/styrene copolymer resin).

In the process in which a rubber component is introduced, to improve the impact resistance of the aromatic vinyl compound/maleic anhydride copolymer, control of the polymerization system becomes difficult as the result of this introduction of the rubber component, and only a limited amount of the rubber component can be used. In the process in which a third component is blended together with the rubber component, not only the above-mentioned disadvantages but also an economical disadvantage occurs. Moreover, in the improvement process comprising the introduction of an ABS resin or the like, the improvement of the impact resistance is not satisfactory, and thus a further improvement is desired.

SUMMARY OF THE INVENTION

Therefore, the object of the present invention is to provide a novel thermoplastic resin composition having a high heat resistance and an excellent impact resistance.

In accordance with the present invention, there is provided a thermoplastic resin composition comprising (A) a graft copolymer obtained by emulsion-graft-polymerizing 0 to 20% by weight of an acrylic monomer and 0 to 60% by weight of an aromatic vinyl monomer in the presence of 40 to 80% by weight (as solids) of a diene type rubber polymer latex containing at least 50% by weight of a diene type rubber polymer copolymer of an $\alpha,\beta$-unsaturated cyclic anhydride and an aromatic vinyl compound.

DESCRIPTION OF THE PREFERRED EMBODIMENTS

In the thermoplastic resin composition, the diene type rubber polymer latex used for preparing the impact resistance improver contains at least 50% by weight, preferably at least 70% by weight, (as solids) of a "large-particle-diameter" rubber latex (diene type rubber polymer) having a weight average particle diameter of at least 0.3 $\mu$m. If the weight average particle diameter of the rubber latex is not large, i.e., the weight average particle diameter is smaller than 0.3 $\mu$m, the impact strength of the finally obtained resin composition is too low.

If the proportion of the large-particle-diameter rubber latex in the diene type rubber polymer latex is smaller than 50% by weight, the effect of using the large-particle-diameter latex is lowered, and as in the case of the use of only the rubber latex having a weight average particle diameter smaller than 0.3 $\mu$m, a resin composition having a low impact strength is obtained.

As the means for preparing the large-particle-diameter rubber latex, there can be adopted a process in which a rubber latex having a desired particle diameter is prepared at a low temperature over a long period in the emulsion polymerization process for preparing a diene type rubber polymer, and a process in which a small-particle-diameter rubber latex prepared by the customary emulsion polymerization process is agglomerated by adding an acid, an electrolyte or a polymer latex having carboxylic acid units, to the rubber latex. Most preferably, a process is adopted in which a polymer latex having carboxylic acid units (for example, an alkyl acrylate/unsaturated acid copolymer) is added to a small-particle-diameter rubber latex prepared by a customary emulsion polymerization process, to agglomerte the rubber.

The process in which the large-particle-diameter rubber latex is prepared at a low temperature over a long period is disadvantageous because the cost is increased by the long-time polymerization., and the process in which the large-particle-diameter rubber latex to be used in the present invention is obtained by effecting agglomeration by the addition of an acid or an electrolyte is disadvantageous from the viewpoint of the stability of the emulsion system.

As the diene type rubber polymer, there can be used polybutadiene and a copolymer composed mainly of butadiene, such as a butadiene/styrene copolymer, a butadiene/acrylonitrile copolymer or a butadiene/butyl acrylate copolymer. Preferably, polybutadiene or a butadiene/styrene copolymer is used. The weight average particle diameter of the diene type rubber polymer latex can be measured from an electron microscope photograph of the latex or by the light scattering method. These measurement methods are described in detail in "Chemistry of Polymeric Latices" by Soichi Muroi.

The graft copolymer (A) used in the composition of the present invention is obtained by emulsion-graft-polymerizing an acrylic monomer and an aromatic vinyl monomer in the presence of the above-mentioned diene type rubber polymer latex. As the acrylic monomer, alkyl methacrylates having 1 to 4 carbon atoms in the alkyl group are preferably used. For example, there can be mentioned methyl methacrylate, ethyl methacrylate, propyl methacrylate, isopropyl methacrylate, n-butyl methacrylate, isobutyl methacrylate, and tertiary butyl methacrylate, most preferably methyl methacrylate. As the aromatic vinyl compound used in the present invention, there can be mentioned styrene, and $\alpha$-substituted styrenes, nucleus-substituted styrenes and derivatives thereof, such as $\alpha$-methylstyrene, chlorostyrene and vinyltoluene.

The proportion of the diene type rubber polymer in the graft copolymer (A) is 40 to 80% by weight as solids. If this proportion exceeds 80% by weight, the compatibility in the final resin composition is almost lost and appearance defects such as hard spots and fish eyes are formed. In contrast, if the proportion is smaller than 40% by weight, the impact resistance improvement is unsatisfactory in the final resin composition.

In view of the compatibility of the obtained graft copolymer with the $\alpha,\beta$-unsaturated cyclic anhydride/aromatic vinyl compound copolymer, the amounts of the acrylic monomer and aromatic vinyl monomer to be subjected to the emulsion graft polymerization are preferably 0 to 20% by weight and 0 to 60% by weight, respectively, and more preferably 5 to 20% by weight and 5 to 40% by weight, respectively.

The graft copolymer to be used as the impact resistance improver in the present invention is preferably prepared by a customary emulsion graft polymerization process. As the emulsifier to be used in this emulsion graft polymerization process, there can be mentioned anionic surface active agents such as fatty acid salts, alkyl sulfate ester salts, alkylbenzenesulfonic acid salts, alkyl phosphate ester salts and dialkylsulfosuccinic acid salts, non-ionic surface active agents such as polyoxyethylene alkyl ethers, polyoxyethylene fatty acid esters, sorbitan fatty acid esters, and glycerol fatty acid esters, and cationic surface active agents such as alkylamine salts. These surface active agents can be used alone or as a mixture of two or more thereof. When a certain kind of the emulsifier is used, the pH value of the polymerization system is shifted to the alkaline side, and in this case, to prevent the hydrolysis of the alkyl ester of acrylic acid, an appropriate pH value-adjusting agent is used.

Conventionally used polymerization initiators, for example, inorganic initiators such as persulfates, organic peroxides and azo compounds can be used alone as the polymerization initiator. Alternatively, these compounds can be used as the redox type initiator in combination with sulfites, hydrogen-sulfites, thiosulfates, primary metal salts and sodium formaldehyde sulfoxylate. As preferred examples of the persulfate as the initiator, there can be mentioned sodium persulfate, potassium persulfate, and ammonium persulfate, and as preferred examples of the organic peroxide, there can be mentioned t-butyl hydroperoxide, cumene hydroperoxide, benzoyl peroxide and lauroyl peroxide.

A chain transfer agent can be used for adjusting the molecular weight of the obtained graft copolymer. For example, an alkylmercaptan having 5 to 20 carbon atoms can be used.

The emulsion graft polymerization is carried out at a temperature higher than the decomposition temperature of the polymerization initiator under usual emulsion polymerization conditions. At each stage of the polymerization, all of each monomer or the monomer mixture can be added at one time, or the polymerization can be carried out by adding all or a part of each monomer or the monomer mixture in a continuous manner. In view of the stability of the polymerization or the removal of the polymerization reaction heat, preferably the polymerization is carried out while adding all or a part of each monomer or the monomer mixture.

The obtained graft copolymer latex is usually coagulated by salting-out or acid precipitation, filtered and dried, and the obtained powder is recovered. Alternatively, the powder is recovered by spray drying, freeze drying or the like.

The $\alpha,\beta$-unsaturated cyclic anhydride/aromatic vinyl compound copolymer (B) to be used in the thermoplastic resin composition of the present invention is a known substance, and is described in pertinent references. Maleic anhydride is most preferred as the $\alpha,\beta$-unsaturated cyclic anhydride, and furthermore, analogues such as itaconic anhydride, citraconic anhydride and aconitic anhydride can be used. Styrene is most preferred as the aromatic vinyl compound, and furthermore, $\alpha$-substituted styrenes, nucleus-substituted styrenes and derivatives thereof, such as $\alpha$-methylstyrene, chlorostyrene, and vinyltoluene, can be used instead of a part or all of the styrene.

The ratio between the $\alpha,\beta$-unsaturated cyclic anhydride to the aromatic vinyl compound in the copolymerization for the preparation of the copolymer is preferably such that the amount of $\alpha,\beta$-unsaturated cyclic anhydride is 40 to 1% by weight, more preferably 25 to 5% by weight, and the amount of aromatic vinyl compound is 60 to 99% by weight, more preferably 75 to 95% by weight. The copolymer (B) and the process for the preparation thereof are described in detail, for example, in Japanese Unexamined Patent Publication No. 55-125113, No. 56-41215 and No. 56-55410. The disclosures of these patent publications are regarded as constituting a part of the present invention by reference thereto.

Mixing of the graft copolymer (A) to be used as the impact resistance improver is uniformly mixed with the $\alpha,\beta$-unsaturated cyclic anhydride/aromatic vinyl compound copolymer (B), preferably in the powdery state, for example, by a ribbon blender, a Henschel mixer or the like, and the mixture is molded and processed by a known kneader such as a mixing roll or a Banbury mixer, an extruder and an injection molding machine or the like. The ratio of the graft copolymer (A) to the copolymer (B) is preferably 1/99 to 40/60 by weight and more preferably 5/95 to 30/70 by weight.

Known additives such as a stabilizer, a plasticizer, a lubricant, an ultraviolet absorber, a release agent, a colorant, and a flame retardant can be incorporated into the thermoplastic resin composition of the present invention according to need.

The present invention will now be described in detail with reference to the following examples, that by no means limit the scope of the invention. In the examples, all of "%" and "parts" are by weight.

EXAMPLE 1 (SAMPLE C OF PRESENT INVENTION)

(1) Synthesis of butadiene polymer (A-1) latex

A mixture comprising 100 parts of 1,3-butadiene, 4-parts of sodium laurate, 0.5 part of n-laurylmercaptan, 0.4 part of potassium persulfate, and 180 parts of deionized water was charged in an autoclave in which the inner atmosphere had been replaced by nitrogen, and polymerization was carried out at 60° C. for 50 hours while stirring to obtain a rubber latex having an average particle diameter of 0.09 μm.

(2) Synthesis of agglomerating polymer latex (B)

| | |
|---|---|
| Ethyl acrylate | 80 parts |
| Methacrylic acid | 20 parts |
| Potassium persulfate | 0.5 part |
| Potassium soap of semi-hardened beef-tallow fatty acid (Nonsal TK-1, supplied by Nippon Oil and Fats) | 2.0 parts |
| Sodium octyl sulfosuccinate (Labisol 80, supplied by Nippon Oil and Fats) | 1.0 part |
| Water | 200 parts |

Using the above recipe, polymerization was carried out at 70° C for 4 hours to obtain an emulsion latex having a pH value of 6.2.

(3) Synthesis of agglomerated latex (A-2)

A reaction vessel equipped with a stirrer was charged with 100 parts (as solids) of the latex (A-1), and 2.0 parts (as solids) of the latex (B) was added while stirring over a period of 10 seconds to obtain an agglomerated latex (A-2). The average particle diameter of the agglomerated latex was 0.5 μm.

(4) Preparation of mixed rubber latex (A-3)

The small-particle-diameter rubber latex (A-1) and large-particle-diameter rubber latex (A-2) obtained at steps (1) and (3) were uniformly mixed at a weight ratio of 20/80 and at room temperature to obtain a mixed rubber latex (A-3).

The weight average particle diameter of the mixed rubber latex (A-3) was measured by the light scattering method (using a Dynamic Light-Scattering Photometer Model DLS-700 supplied by Ohtsuka Denshi) and from a photograph taken by a transmission electron microscope (Model JEM-l00S supplied by Nippon Denshi) after the treatment of the rubber latex with an aqueous solution of osmium tetroxide. It was confirmed that the weight average particle diameters determined by the above methods were in close agreement with each other. The measurement results obtained by the light scattering method are shown in the column of sample C of the present invention in Table 1.

(5) Synthesis of graft copolymer (G-1)

A reaction vessel was charged with 60 parts (as solids) of the mixed rubber latex (A-3) obtained at step (4) and 0.15 part of Rongalit as the reducing agent, and a liquid mixture comprising 8 parts of methyl methacrylate and 2 parts of ethyl acrylate, in which 0.04 part of cumene hydroperoxide (hereinafter referred to as "CHP") was incorporated, was continuously dropped into the reaction vessel over a period of 1 hour while maintaining the inner temperature at 70° C, and the reaction mixture was maintained at this temperature for 1 hour. Subsequently, at the second stage, a mixture of 25 parts of styrene and 0.1 part of CHP was continuously dropped into the reaction mixture over a period of 1 hour, and the reaction mixture was maintained at the above temperature for 2 hours. Then, at the third stage, a liquid mixture comprising 4 parts of methyl metahcrylate, 1 part of ethyl acrylate, and 0.02 part of CHP was added dropwise over a period of 15 minutes and the reaction mixture was maintained at the above temperature for 1 hour to complete the polymerization. Then 1.0 part of BHT (2,6-di-tert-butyl-p-cresol) was added as a heat stabilizer to the obtained latex, and the latex was coagulated by a 0.2% aqueous solution of sulfuric acid. The coagulation product was washed with warm water and dried to obtain a graft copolymer (G-1).

(6) Preparation of thermoplastic resin composition

The graft copolymer (G-1) obtained at step (5) was thoroughly mixed with a maleic anhydride/styrene copolymer (Dailark 332 supplied by Sekisui Kaseihin) at a weight ratio of 25/75, by using a mixer, and the mixture was melt-kneaded and pelletized at 230° C by using a vented extruder having a diameter of 25 mm. The pellet was vacuum-dried and injection-molded at a mold temperature of 60° C under an injection pressure of 40 kg/cm$^2$ by using an injection molding machine (Model SAV-60 supplied by Mishiro Seiki), and the impact resistance and heat resistance of the obtained molded article were measured. The results are shown in the column of sample C of the present invention in Table 1.

At the impact resistance, the notched izod impact strength was measured according to ASTM-D-256, and as the heat resistance, the Vicat softening temperature was measured under a load of 5 kg by the VDE method.

EXAMPLE 2 (SAMPLES A, B AND D OF PRESENT INVENTION)

The procedures of Example 1 were repeated i the same manner except that the mixing ratio of the small-particle-diameter rubber latex (A-1) to the large-particle-diameter rubber latex (A-2) at step (4) was changed as shown in Table 1. The obtained results are shown in columns of samples A, B and D of the present invention in Table 1.

COMPARATIVE EXAMPLE 1 (COMPARATIVE SAMPLES A, B, C AND D)

The procedures of Example 1 were repeated in the same manner except that the mixing ratio of the small-particle-diameter rubber latex (A-1) to the large-particle-diameter rubber latex (A-2) at the step (4) was changed as shown in Table 1. Note, in comparative sample D, the measurement was carried out by using only Dailark 332. The results are shown in columns of comparative samples A, B, C, and D in Table 1.

TABLE 1

| | Samples of Present Invention | | | | Comparative Samples | | | |
|---|---|---|---|---|---|---|---|---|
| | A | B | C | D | A | B | C | D |
| Weight ratio of (A-1) (%) | 0 | 10 | 20 | 30 | 50 | 80 | 100 | 0 |
| Weight ratio of (A-2) (%) | 100 | 90 | 80 | 70 | 50 | 20 | 0 | 0 |
| Weight ratio of rubber having particle diameter of at least 0.3 μm as measured by light scattering method (%) | 90 | 80 | 71 | 65 | 45 | 16 | 0 | No rubber |
| Izod impact strength (kg.cm/cm$^2$) | 12.8 | 11.5 | 11.0 | 8.5 | 5.4 | 3.8 | 2.9 | 2.4 |

TABLE 1-continued

|  | Samples of Present Invention | | | | Comparative Samples | | | |
| --- | --- | --- | --- | --- | --- | --- | --- | --- |
|  | A | B | C | D | A | B | C | D |
| Vicat softening temperature (°C.) | 117.3 | 118.0 | 116.9 | 117.1 | 117.0 | 116.5 | 117.8 | 126.6 |

EXAMPLE 3 (SAMPLES E THROUGH I OF PRESENT INVENTION)

The procedures of Example 1 were repeated in the same manner except that in the synthesis of the agglomerating polymer latex (B) at step (2), the weight ratio of ethyl acrylate to methacrylic acid was changed as shown in Table 2. The results are shown in columns of samples E through I of the present invention in Table 2.

COMPARATIVE EXAMPLE 2 (COMPARATIVE SAMPLES E THROUGH H)

The procedures of Example 1 were repeated in the same manner as described in Example 1 except that, in the synthesis of the coarsening polymer latex (B) at step (2), the weight ratio of ethyl acrylate to methacrylic acid was changed as shown in Table 2, and in comparative sample H, the measurement was carried out by using Dailark 332 alone. The results are shown in columns of comparative samples E through H in Table 2.

-continued

| Water | 200 parts |
| --- | --- |

Using the above recipe, polymerization was carried out at 50° C in a pressure-resistant autoclave. The polymerization was completed in 8 hours, and the average particle diameter of the obtained rubber was 0.08 μm.

(2) The obtained rubber latex (A-4) was agglomerated by using the agglomerating polymer latex (B) prepared at step (2) of Example 1, and an agglomerated latex (A-5) having an average particle diameter of 0.53 μm was prepared in the same manner as at step (3) of Example 1. Then, the procedures of steps (4) through (6) of Example 1 were repeated in the same manner.

The mechanical properties and thermal properties of a thermoplastic resin composition obtained when the butadiene/styrene rubber latex (A-4) and agglomerated latex (A-5) were used at the weight ratio shown in Table 3 were measured, and the results are shown in columns of samples J through M of the present invention in Table 3.

TABLE 2

|  | Samples of Present Invention | | | | | Comparative Samples | | | |
| --- | --- | --- | --- | --- | --- | --- | --- | --- | --- |
|  | E | F | G | H | I | E | F | G | H |
| Amount of ethyl acrylate in latex (B) (parts) | 85 | 82 | 80 | 78 | 75 | 90 | 95 | 100 | — |
| Amount of methacrylic acid in latex (B) (parts) | 15 | 18 | 20 | 22 | 25 | 10 | 5 | 0 | — |
| Average particle diameter of agglomerated latex (μm) | 0.35 | 0.42 | 0.50 | 0.58 | 0.62 | 0.28 | 0.15 | 0.08 | No rubber |
| Izod impact strength (kg.cm/cm$^2$) | 8.8 | 10.5 | 11.0 | 11.9 | 12.8 | 3.8 | 3.1 | 2.8 | 2.4 |
| Vicat softening temperature (°C.) | 117.2 | 116.8 | 116.9 | 116.5 | 116.9 | 117.2 | 116.6 | 117.1 | 126.6 |

EXAMPLE 4 (SAMPLES J THROUGH M OF PRESENT INVENTION)

(1) Preparation of butadiene/styrene copolymer

| (A-4) latex | |
| --- | --- |
| 1,3-Butadiene | 75 parts |
| Styrene | 25 parts |
| Divinylbenzene | 1 part |
| Di-iso-propylbenzene hydroperoxide | 0.2 part |
| Sodium pyrophosphate | 0.5 part |
| Ferrous sulfate | 0.01 part |
| Dextrose | 1.0 part |
| Potassium oleate | 2.0 parts | tion in Table 3.

COMPARATIVE EXAMPLE 3 (COMPARATIVE SAMPLES I THROUGH K)

The procedures of Example 4 were repeated in the same manner except that the weight ratio of the butadiene/styrene rubber latex (A-4) to the agglomerated latex (A-5) were changed as shown in Table 3. The mechanical properties and thermal properties of the obtained thermoplastic resin compositions are shown in columns of comparative samples I through K in Table 3.

TABLE 3

|  | Samples of Present Invention | | | | Comparative Samples | | |
| --- | --- | --- | --- | --- | --- | --- | --- |
|  | J | K | L | M | I | J | K |
| Weight ratio of (A-4) (%) | 0 | 10 | 20 | 30 | 50 | 80 | 100 |
| Weight ratio of (A-5) (%) | 100 | 90 | 80 | 70 | 50 | 20 | 0 |
| Weight ratio of rubber having average particle diameter of at least 0.3 μm as measured by light scattering method (%) | 93 | 85 | 72 | 62 | 46 | 18 | 0 |
| Izod impact strength (kg.cm/cm$^2$) | 11.4 | 10.6 | 9.5 | 7.8 | 4.3 | 3.1 | 2.1 |
| Vicat softening temperature (°C.) | 115.8 | 115.8 | 115.1 | 113.9 | 114.3 | 116.1 | 115.2 |

EXAMPLE 5 (SAMPLES N THROUGH P OF PRESENT INVENTION)

The procedures of Example 1 were repeated in the same manner, except for the following changes. Namely, 60 parts (as solids) of the mixed rubber latex (A-3) obtained at step (4) of Example 1 and 0.15 part of Rongalit as the reducing agent were charged, and while maintaining the inner temperature at 70° C, a liquid mixture of methyl methacrylate and styrene containing 0.15 part of CHP, shown in Table 4, was continuously added dropwise over a period of 2 hours. Then, the reaction mixture was maintained at the above temperature for 2 hours to complete the polymerization, 1.0 part of BHT was added as a heat stabilizer to the obtained latex, and the latex was coagulated by a 0.2% aqueous solution of sulfuric acid. The coagulated product was washed with warm water and dried to obtain a graft copolymer.

The mechanical properties of the obtained thermoplastic resin compositions are shown in columns of samples N through P of the present invention in Table 4.

COMPARATIVE EXAMPLE 4 (COMPARATIVE SAMPLES L THROUGH N

The procedures of Example 5 were repeated in the same manner except that the weight ratio of methyl methacrylate to styrene was changed as shown in Table 4. The mechanical properties of the obtained thermoplastic resin compositions are shown in columns of comparative samples L through N in Table 4.

TABLE 4

|  | Samples of Present Invention | | | Comparative Samples | | |
|---|---|---|---|---|---|---|
|  | N | O | P | L | M | N |
| Amount of methyl methacrylate (%) | 10 | 15 | 20 | 25 | 30 | 40 |
| Amount of styrene (%) | 30 | 25 | 20 | 15 | 10 | 0 |
| Izod impact strength (kg.cm/cm$^2$) | 11.0 | 11.5 | 11.5 | 7.9 | 6.5 | 3.2 |

EXAMPLE 6 (SAMPLES Q THROUGH T OF PRESENT INVENTION)

The procedures of Example 1 were repeated in the same manner except that the amount (as solids) of the mixed rubber latex (A-3) obtained at step (4) of Example 1 was changed as shown in Table 5, and the graft copolymerization at step (5) was correspondingly changed. The mechanical properties of the obtained thermoplastic resin compositions and the surface appearances observed with the naked eye are shown in columns of samples Q through T of the present invention in Table 5.

COMPARATIVE EXAMPLE 5 COMPARATIVE SAMPLES O AND P)

The procedures of Example 6 were repeated in the same manner except that the amount (as solids) of the mixed rubber latex was changed as shown in Table 5. The mechanical properties of the obtained thermoplastic resin compositions and the surface appearances observed with the naked eye are shown in columns of comparative samples O and P in Table 5.

TABLE 5

|  | Samples of Present Invention | | | | Comparative Samples | |
|---|---|---|---|---|---|---|
|  | Q | R | S | T | O | P |
| Amount of rubber (as solids) (%) | 40 | 50 | 60 | 70 | 30 | 90 |
| Izod impact strength (kg.cm/cm$^2$) | 8.5 | 10.5 | 11.0 | 12.8 | 6.4 | 9.5 |
| Surface appearance | Good | Good | Good | Good | Good | Poor |

According to the present invention, when preparing an MBS resin as an impact resistance-improver for an aromatic vinyl compound/maleic anhydride copolymer by emulsion polymerization, using a diene type rubber polymer latex containing at least 50% by weight of a diene type rubber polymer having a particle diameter of at least 0.3 μm as the rubber component of the MBS resin, the obtained MBS resin is especially effective for improving the impact resistance of the aromatic vinyl compound/maleic anhydride copolymer, and therefore, a heat-resistant thermoplastic resin composition having a superior impact resistance can be provided.

We claim:

1. A thermoplastic resin composition, comprising:
   (A) a graft copolymer obtained by emulsion-graft-polymerizing 5 to 20% by weight of an alkyl methacrylate having 1 to 4 carbon atoms in the alkyl group and 5 to 60% by weight of an aromatic vinyl monomer selected from the group consisting of styrene, α-substituted styrenes and nucleus-substituted styrenes in the presence of 40 to 80% by weight (as solids) of a diene type rubber polymer latex containing at least 50% by weight of a diene type rubber polymer having a weight average particle diameter of at least 0.3 μm, and
   (B) a copolymer of an α,β-unsaturated cyclic anhydride and an aromatic vinyl compound, the ratio of the graft copolymer (A) to the copolymer (B) being 1/99 to 40/60 by weight.

2. A thermoplastic resin composition according to claim 1, wherein the diene type rubber polymer latex is obtained by adding an agglomerating agent to a small-particle-diameter rubber latex prepared by the emulsion polymerization.

3. A thermoplastic resin composition according to claim 2, wherein the agglomerating agent is a polymer latex having carboxylic acid units.

4. A thermoplastic resin composition according to claim 1, wherein the diene type rubber polymer latex contains at least 70% by weight of a diene type rubber polymer having a weight average particle diameter of at least 0.3 μm.

5. A thermoplastic resin composition according to claim 1, wherein the diene type rubber polymer is polybutadiene or a butadiene/styrene copolymer.

6. A thermoplastic resin composition according to claim 1, wherein the aromatic vinyl monomer is styrene.

7. A thermoplastic resin composition according to claim 1, wherein the amount of the aromatic vinyl monomer is 5 to 40% by weight based on the graft copolymer (A).

8. A thermoplastic resin composition according to claim 1, wherein the α,β-unsaturated cyclic anhydride is maleic anhydride.

9. A thermoplastic resin composition according to claim 1, wherein the aromatic vinyl compound is styrene.

10. A thermoplastic resin composition according to claim 1, wherein the ratio of the α,β-unsaturated cyclic anhydride to the aromatic vinyl compound is from 40/60 to 1/99 by weight.

11. A thermoplastic resin composition according to claim 1, wherein the ratio of the α,β-unsaturated cyclic anhydride to the aromatic vinyl compound is from 25/75 to 5/95 by weight.

* * * * *